United States Patent
Godo et al.

(10) Patent No.: US 11,680,639 B1
(45) Date of Patent: Jun. 20, 2023

(54) DRIVE AXLE SYSTEM AND METHOD OF CONTROL

(71) Applicant: ArvinMeritor Technology, LLC, Troy, MI (US)

(72) Inventors: Edvin Godo, Troy, MI (US); Banuchandar Muthukumar, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/877,372

(22) Filed: Jul. 29, 2022

(51) Int. Cl.
*F16H 61/04* (2006.01)
*F16H 61/684* (2006.01)
*B60L 15/20* (2006.01)
*F16H 63/50* (2006.01)

(52) U.S. Cl.
CPC ...... *F16H 61/0403* (2013.01); *B60L 15/2054* (2013.01); *F16H 61/684* (2013.01); *F16H 63/50* (2013.01); *F16H 2061/0422* (2013.01)

(58) Field of Classification Search
CPC .... F16H 61/0403; F16H 61/684; F16H 63/50; F16H 2061/0422; B60L 15/2054
See application file for complete search history.

(56) References Cited

U.S. PATENT DOCUMENTS

| | | | |
|---|---|---|---|
| 10,989,288 B1 | 4/2021 | Ghatti et al. | |
| 11,002,352 B2 | 5/2021 | Ghatti et al. | |
| 11,038,396 B2 | 6/2021 | Raya et al. | |
| 11,207,976 B2 | 12/2021 | Ghatti et al. | |
| 11,209,072 B2 | 12/2021 | Ghatti et al. | |
| 11,220,176 B1 | 1/2022 | Cradit et al. | |
| 2014/0235402 A1* | 8/2014 | Matsubara | B60L 15/2054 477/8 |
| 2020/0361303 A1* | 11/2020 | Meyer | B60K 1/02 |
| 2021/0053549 A1* | 2/2021 | Chen | B60W 10/08 |
| 2021/0291646 A1 | 9/2021 | Lorenz et al. | |

FOREIGN PATENT DOCUMENTS

CN 114103657 A * 3/2022 ............ B60K 1/02
WO WO-2022128498 A1 * 6/2022

OTHER PUBLICATIONS

Cradit et al., U.S. Appl. No. 17/308,307, filed May 5, 2021, 46 pages.

* cited by examiner

*Primary Examiner* — Justin Holmes
(74) *Attorney, Agent, or Firm* — Brooks Kushman PC

(57) ABSTRACT

A method of controlling a drive axle system. The method may include executing a gear upshift or a gear downshift after decreasing the torque that is provided by an electric motor to a transmission of an axle assembly and increasing the torque that is provided by another electric motor to a transmission of another axle assembly.

20 Claims, 2 Drawing Sheets

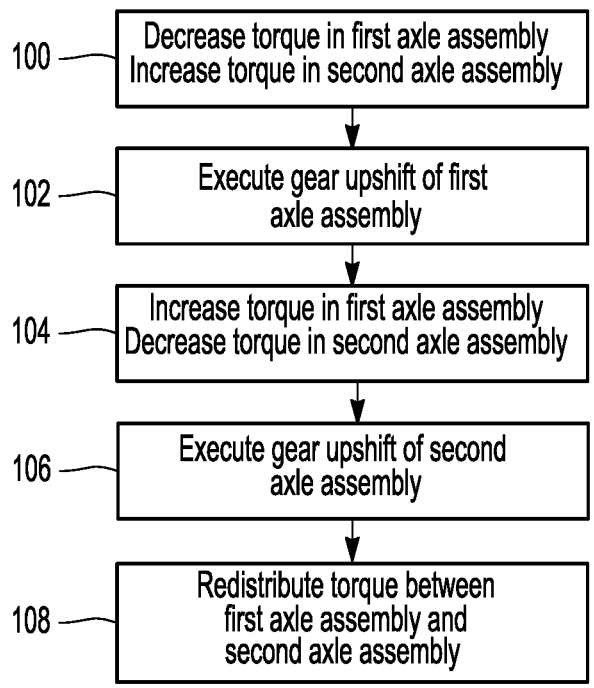
_Fig-2_
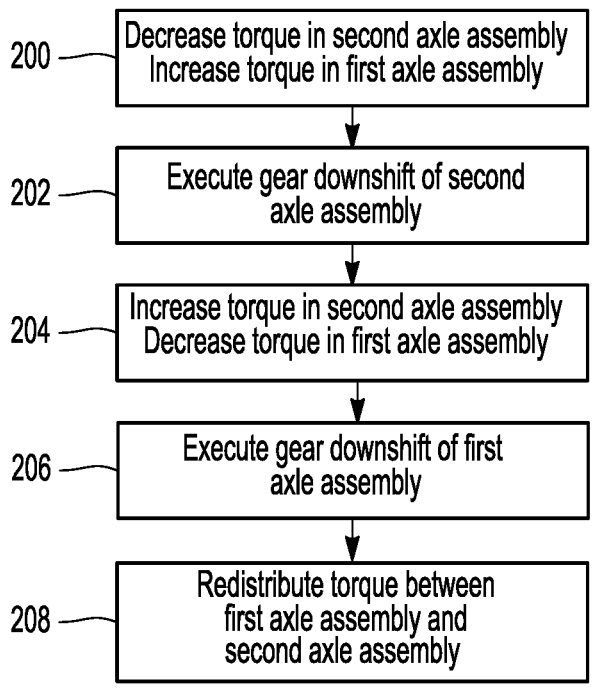
_Fig-3_

DRIVE AXLE SYSTEM AND METHOD OF CONTROL

TECHNICAL FIELD

This relates to a drive axle system for a vehicle and a method of control.

BACKGROUND

A drive axle system having electric motors is disclosed in United States Patent Publication No. 2021/0291646.

SUMMARY

In at least one embodiment a method of controlling a drive axle system is provided. The method includes providing torque with a first axle assembly and a second axle assembly. The first axle assembly has a first transmission and a first electric motor. The first electric motor provides torque to the first transmission. The first transmission has a first gear ratio and a second gear ratio that differs from the first gear ratio. The second axle assembly has a second transmission and a second electric motor. The second electric motor provides torque to the second transmission. The second transmission has a first gear ratio and a second gear ratio that differs from the first gear ratio. Torque is provided via the first gear ratio of the first axle assembly and the first gear ratio of the second axle assembly. The method further includes decreasing torque that is provided by the first electric motor to the first transmission, increasing torque that is provided by the second electric motor to the second transmission, and executing a gear upshift of the first axle assembly. The gear upshift is executed by disengaging the first gear ratio of the first axle assembly and engaging the second gear ratio of the first axle assembly.

The first gear ratio of the first transmission may be numerically greater than the second gear ratio of the first transmission. The first gear ratio of the second transmission may be numerically greater than the second gear ratio of the second transmission. The first electric motor does not provide torque to the second axle assembly. The second electric motor does not provide torque to the first axle assembly.

Decreasing the torque that is provided by the first electric motor to the first transmission and increasing the torque that is provided by the second electric motor to the second transmission may occur simultaneously.

Torque that is provided by the first electric motor to the first transmission and torque that is provided by the second electric motor to the second transmission may be substantially equal before decreasing the torque that is provided by the first electric motor to the first transmission.

The method may include increasing the torque that is provided by the first electric motor to the first transmission in decreasing the torque that is provided by the second electric motor to the second transmission after executing the gear upshift of the first axle assembly. Increasing the torque that is provided by the first electric motor to the first transmission and decreasing the torque that is provided by the second electric motor to the second transmission may occur simultaneously.

The method may include executing a gear upshift of the second axle assembly. The gear upshift of the second axle assembly may be executed by disengaging the first gear ratio of the second axle assembly and engaging the second gear ratio of the second axle assembly. Executing the gear upshift of the second axle assembly may occur after increasing the torque that is provided by the electric motor to the first transmission and decreasing the torque that is provided by the second electric motor to the second transmission.

The method may include decreasing torque that is provided by the first electric motor to the first transmission and increasing torque that is provided by the second electric motor to the second transmission after executing the gear upshift of the second axle assembly. Decreasing the torque that is provided by the first electric motor to the first transmission and increasing the torque that is provided by the second electric motor to the second transmission may occur simultaneously. Torque that is provided by the first electric motor to the first transmission and torque that is provided by the second electric motor to the second transmission may be substantially equal after decreasing the torque that is provided by the first electric motor to the first transmission and increasing the torque that is provided by the second electric motor to the second transmission.

In at least one embodiment, a method of controlling a drive axle system is provided. The method includes providing torque with a first axle assembly and a second axle assembly. The first axle assembly has a first transmission and a first electric motor. The first electric motor provides torque to the first transmission. The first transmission has a first gear ratio and a second gear ratio that differs from the first gear ratio. The second axle assembly has a second transmission and a second electric motor. The second electric motor provides torque to the second transmission. The second transmission has a first gear ratio and a second gear ratio that differs from the first gear ratio. Torque is provided via the second gear ratio of the first axle assembly and the second gear ratio of the second axle assembly. The method further includes decreasing the torque that is provided by the second electric motor to the second transmission, increasing the torque that is provided by the first electric motor to the first transmission, and executing a gear downshift of the second axle assembly. The gear downshift of the second axle assembly is executed by disengaging the second gear ratio of the second axle assembly and engaging the first gear ratio of the second axle assembly.

Decreasing the torque that is provided by the second electric motor to the second transmission and increasing the torque that is provided by the first electric motor to the first transmission may occur simultaneously.

Torque that is provided by the first electric motor to the first transmission and torque is provided by the second electric motor to the second transmission may be substantially equal before decreasing the torque that is provided by the second electric motor to the second transmission.

The method may include increasing the torque that is provided by the second electric motor to the second transmission in decreasing the torque that is provided by the first electric motor to the first transmission after executing the gear downshift of the second axle assembly. Increasing the torque that is provided by the second electric motor to the second transmission and decreasing the torque that is provided by the first electric motor to the first transmission may occur simultaneously.

The method may include executing a gear downshift of the first axle assembly by disengaging the second gear ratio of the first axle assembly and engaging the first gear ratio of the first axle assembly after increasing the torque that is provided by the second electric motor to the second transmission in decreasing the torque that is provided by the first electric motor to the first transmission.

The method may include decreasing the torque that is provided by the second electric motor to the second transmission and increasing the torque that is provided by the first electric motor to the first transmission after executing the gear downshift of the first axle assembly. Decreasing the torque that is provided by the second electric motor to the second transmission and increasing the torque that is provided by the first electric motor to the first transmission may occur simultaneously. Torque that is provided by the first electric motor to the first transmission and torque that is provided to by the second electric motor to the second transmission may be substantially equal after decreasing the torque that is provided by the second electric motor to the second transmission and increasing the torque that is provided by the first electric motor to the first transmission.

BRIEF DESCRIPTION OF THE DRAWINGS

FIG. 2 is a flowchart of a method of controlling the drive axle system that is associated with executing a gear upshift.

FIG. 3 is a flowchart of a method of controlling drive axle system that is associated with executing a gear downshift.

DETAILED DESCRIPTION

Figure 1:
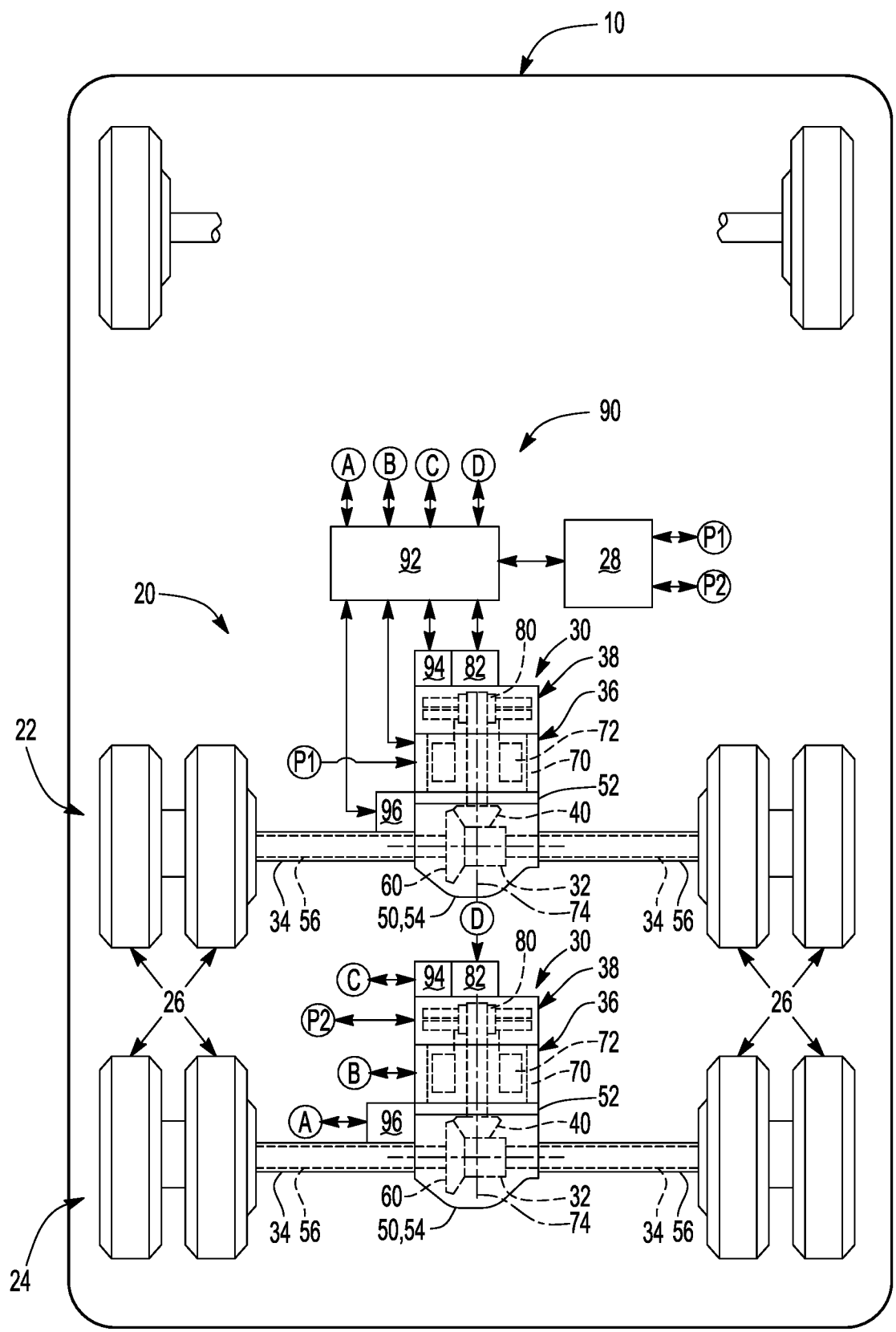
FIG. 1 is a schematic representation of a vehicle having a drive axle system.

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 includes a drive axle system 20.

The drive axle system 20 includes a plurality of axle assemblies, such as a front axle assembly 22 and a rear axle assembly 24. The front axle assembly 22 and the rear axle assembly 24 are drive axle assemblies. A drive axle assembly may be configured to provide torque to one or more wheel assemblies 26 that may be rotatably supported on the axle assembly. A wheel assembly 26 may include a tire disposed on a wheel. The drive axle system 20 may also include or be associated with a power source 28, such as an electrical power source like a battery.

In at least one configuration, the front axle assembly 22 and the rear axle assembly 24 may generally be disposed near each other and may be positioned toward the rear of the vehicle 10, similar to a conventional tandem axle arrangement. However, unlike a conventional tandem axle arrangement, the front axle assembly 22 and the rear axle assembly 24 are not operatively connected to each other and do not receive torque from the same electric motor. As such, the front axle assembly 22 and the rear axle assembly 24 are not connected in series with each other with a shaft, such as a prop shaft that may connect an output of the front axle assembly 22 with an input of the rear axle assembly 24. It is also contemplated that the front axle assembly 22 and the rear axle assembly 24 may be arranged in a different manner, such as with either or both axle assemblies being disposed near the front of the vehicle.

The front axle assembly 22 and the rear axle assembly 24 may have similar or identical configurations. For example, both axle assemblies 22, 24 include a housing assembly 30, a differential assembly 32, a pair of axle shafts 34, an electric motor 36, a transmission 38, a drive pinion 40, or combinations thereof. The positioning of the differential assembly 32, the electric motor 36, and/or the transmission 38 may differ from that shown. For instance, the differential assembly 32 may be positioned between the electric motor 36 and the transmission 38.

The housing assembly 30 receives various components of the axle assembly 22, 24. In addition, the housing assembly 30 may facilitate mounting of the axle assembly to the vehicle 10. In at least one configuration, the housing assembly 30 may include an axle housing 50 and a differential carrier 52.

The axle housing 50 may receive and support the axle shafts 34. In at least one configuration, the axle housing 50 may include a center portion 54 and at least one arm portion 56.

The center portion 54 may be disposed proximate the center of the axle housing 50. The center portion 54 may define a cavity that may receive the differential assembly 32.

One or more arm portions 56 may extend from the center portion 54. For example, two arm portions 56 may extend in opposite directions from the center portion 54 and away from the differential assembly 32. The arm portions 56 may each have a hollow configuration or tubular configuration that may extend around and may receive a corresponding axle shaft 34 and may help separate or isolate the axle shaft 34 from the surrounding environment. A wheel hub may be rotatably disposed on an arm portion 56 and operatively connected to an axle shaft 34. A wheel assembly 26 may be mounted to the wheel hub.

The differential carrier 52 may be mounted to the center portion 54 of the axle housing 50. The differential assembly 32 may be rotatably supported on the differential carrier 52.

The differential assembly 32 is disposed in the housing assembly 30. For instance, the differential assembly 32 may be disposed in the center portion 54 of the axle housing 50. The differential assembly 32 may transmit torque to the axle shafts 34 of the axle assembly and permit the axle shafts and wheel assemblies 26 to rotate at different velocities in a manner known by those skilled in the art. For example, the differential assembly 32 may have a ring gear 60 that may be fixedly mounted on a differential case. The ring gear 60 and the differential case may be rotatable about a differential axis. The differential case may receive differential gears that may be operatively connected to the axle shafts 34.

The axle shafts 34 are configured to transmit torque between the differential assembly 32 and a corresponding wheel hub. For example, two axle shafts 34 may be provided such that each axle shaft 34 extends through a different arm portion 56 of axle housing 50. The axle shafts 34 may be rotatable about an axis, such as a wheel axis or the differential axis.

The electric motor 36 is configured to provide torque, such as propulsion torque or regenerative braking torque. Propulsion torque may be used to propel the vehicle 10, such as in a forward or backward direction. Propulsion torque may also be used to hold the vehicle in a stationary position or to help reduce or limit vehicle rollback, such as on an inclined surface. Regenerative braking may provide a regenerative braking torque, which may also be referred to as regenerative brake torque. Regenerative braking may capture kinetic energy when the electric motor 36 is used to brake or slow the velocity of the vehicle 10. Recovered energy may be transmitted from the wheel assemblies 26 to drive the electric motor 36. Thus, the electric motor 36 may function as a generator and may be used to charge the power source 28. The electric motor 36 may be electrically connected to the power source 28 via an inverter in a manner known by those skilled in the art. Electrical connections between the front axle assembly 22 and the rear axle assembly 24 and the power source 28 are represented with connection symbols P1 and P2, respectively.

The electric motor 36 may be mounted to or positioned inside of the housing assembly 30. The electric motor 36 includes a stator 70 and a rotor 72. The stator 70 may be fixedly positioned with respect to the housing assembly 30. The stator 70 may encircle the rotor 72. The rotor 72 is rotatable about an axis 74 with respect to the stator 70.

The transmission 38 facilitates the transmission of torque between the electric motor 36 and the drive pinion 40. Torque transmission may be bidirectional. The transmission 38 may provide gear reduction and multiple gear ratios between the rotor 72 and the drive pinion 40. The transmission 38 may be of any suitable type. For instance, the transmission 38 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. No. 11,038,396 and U.S. patent application Ser. No. 17/308,307. The disclosures of the references in the preceding three sentences are hereby incorporated in their entirety by reference herein. The transmission 38 may include a clutch 80 and a clutch actuator 82.

A clutch 80 controls rotation of one part with respect to another part. For instance, a clutch may connect and disconnect two parts, such as a driving part and a driven part. A clutch may have any suitable configuration. For example, a clutch may be configured as a friction clutch, electromagnetic clutch, hydraulic clutch or the like. A clutch may be configured as a slip clutch or a nonslip clutch. Slip clutches may be provided in various configurations, an example of which is a multi-plate clutch. A clutch 80 facilitates the engagement and disengagement of a component of the transmission 38 to provide a desired gear ratio. For example, a clutch may selectively couple a gear of a countershaft transmission to a shaft to permit torque transmission via that gear, and hence with an associated gear ratio, and may disengage or be decoupled from that gear to disable torque transmission via that gear. Similarly, a clutch may engage a component of an epicyclic gear set, such as a sun gear, to provide a first gear ratio and may engage another component, such as a planet gear carrier, to provide a second gear ratio. It is contemplated that the same clutch or different clutches may be used to provide different gear ratios. For simplicity, the clutch 80 will primarily be described in the context of a clutch that may move with respect to the drive pinion 40 or slide along the drive pinion 40 between a first position and a second position in which the clutch 80 couples or operatively connects different components to the drive pinion 40. For instance, the clutch 80 may couple a sun gear of an epicyclic gear set or a first gear of a countershaft gear set to the drive pinion 40 when in the first position and may couple a planet gear carrier of an epicyclic gear set or a second gear of a countershaft gear set to the drive pinion 40 when in a second position. The clutch 80 may also be positionable in a neutral position in which the clutch 80 does not operatively connect or transmit torque between the transmission 38 and the drive pinion 40.

The clutch actuator 82 may actuate the clutch 80. For instance, the clutch actuator 82 may actuate the clutch 80 between a first position, a neutral position, a second position, or combinations thereof. For example, the clutch actuator 82 may move a clutch 80 between two positions, such as the first position and the neutral position, or all three positions. In at least one configuration, the clutch actuator 82 may move the clutch 80 along an axis, such as the axis 74, a countershaft axis, or the like. The clutch actuator 82 may be mounted on or inside the housing assembly 30.

The drive pinion 40 operatively connects the differential assembly 32 and the transmission 38. The drive pinion 40 may be received in the housing assembly 30 and may transmit torque between the differential assembly 32 and a transmission 38. The drive pinion 40 may be rotatable about an axis, such as the axis 74, and may have a gear portion that has teeth that meshes with teeth of the ring gear 60 of the differential assembly 32. Torque may be transmitted between the transmission 38 and the drive pinion 40 when the drive pinion 40 is operatively connected to the transmission 38. For example, torque that is provided from the electric motor 36 to the transmission 38 and to the drive pinion 40 may be transmitted to the ring gear 60 and thus to the differential assembly 32.

A control system 90 controls operation of the drive axle system 20. For example, the control system 90 may include one or more microprocessor-based control modules or controllers 92 that may be electrically connected to or communicate with components of the vehicle 10 and/or the axle assemblies 22, 24, such as the electric motors 36 and clutch actuators 82 of both axle assemblies 22, 24. Control system connections are represented by the double arrowed lines in FIG. 1 as well as by connection symbols A, B, C, and D. The control system 90 may also monitor and control the power source 28. In addition, the control system 90 may also process input signals or data from various input devices or sensors. These input devices may include a first speed sensor 94, a second speed sensor 96, or combinations thereof.

The first speed sensor 94 may detect or provide a signal indicative of the rotational speed or rotational velocity of a rotatable component disposed upstream from the clutch 80, such as the rotor 72 or a gear of the transmission 38.

The second speed sensor 96 may detect or provide a signal indicative of the rotational speed or rotational velocity of the clutch 80 or a rotatable component disposed downstream from the clutch 80, such as the drive pinion 40, the differential assembly 32, an axle shaft 34, a wheel hub or the like. The first speed sensor 94 and the second speed sensor 96 may be used in conjunction to determine when the rotational speed of the clutch 80 is sufficiently synchronized with the rotational speed of another component, such as a transmission gear, to permit movement or shifting of the clutch 80. Accordingly, the terms "synchronized" or "sufficiently synchronized" mean that the rotational speed of two components may be sufficiently close so as to permit the clutch 80 to be shifted and may not require exactly the same rotational speed.

Referring to FIGS. 2 and 3, flowcharts of examples of methods of controlling a drive axle system 20 are shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 90 and may be implemented as a closed loop control system.

As an overview, a vehicle that has axle assemblies that have multi-speed transmissions and corresponding dedicated electrical motors allows each axle assembly to be independently controlled. Independent control without coordination can lead to problems. For instance, shifting gears of the transmissions of both axle assemblies at the same time may result in the temporary loss of torque. In the case of propulsion torque, the temporary loss of propulsion torque can be perceived as a lack of responsiveness by the vehicle driver. To address this, the method staggers gear shifts from one gear ratio to another so that gear shifts of the first and second axle assemblies are not conducted at the same time. As a result, at least one axle assembly can continue to provide propulsion torque or regenerative braking torque. In addition, the method temporarily redistributes torque before a gear shift is executed so that the axle assembly that is not undergoing a gear shift continues to provide the requested torque while torque is modulated in the other axle assembly to facilitate a gear shift to either a higher gear ratio or a lower gear ratio.

For clarity in reference, the axle assemblies associated with the method are referred to as a "first axle assembly" and a "second axle assembly." The first axle assembly may be either the front axle assembly 22 or the rear axle assembly 24 while the second axle assembly may be the axle assembly that is not the first axle assembly, and thus may also be other of the front axle assembly 22 or the rear axle assembly 24.

Also for clarity in reference, the first axle assembly is referred to as having a first transmission and a first electric motor. The first electric motor may provide propulsion torque or regenerative braking torque to the first transmission but not a second transmission of the second axle assembly. The first transmission has a plurality of gear ratios. These gear ratios include at least a first gear ratio and a second gear ratio. The first gear ratio and the second gear ratio of the first transmission differ from each other. For instance, the first gear ratio may have a larger numerical gear ratio than the second gear ratio. As a nonlimiting example, the first gear ratio may provide a 2:1 gear ratio or more while the second gear ratio may provide a lesser numerical gear ratio, such as 1:1. Similarly, the second axle assembly is referred to as having a second transmission and a second electric motor. The second electric motor may provide propulsion torque or regenerative braking torque to the second transmission but not the first transmission. The second transmission has a plurality of gear ratios. These gear ratios include at least a first gear ratio and a second gear ratio. The first gear ratio and the second gear ratio of the second transmission differ from each other as described above with respect to the first axle assembly.

Referring to FIG. 2, a flowchart is shown that is associated with executing a gear upshift. The method steps shown in FIG. 2 are used to coordinate and execute a gear upshift for both axle assemblies and are configured to be implemented when both axle assemblies are sufficiently close to operating conditions in which an upshift from a first gear ratio (e.g., low speed gear ratio) to a second gear ratio (e.g., a higher speed gear ratio) is desired. For illustration purposes, the method is described under the following initial operational conditions. First, propulsion torque is being provided by both the first axle assembly and the second axle assembly. Second, the first axle assembly and the second axle assembly are providing propulsion torque via their respective first gear ratios. In addition, the total torque may initially be split substantially equally between the first axle assembly and the second axle assembly. For instance, the torque that is provided by the first electric motor to the first transmission and the torque that is provided by the second electric motor to the second transmission may be substantially equal. The term "substantially equal" as used herein means equal or very close to equal and includes output torque that is within 5% of being equal to each other.

At block 100, the propulsion torque is redistributed between the axle assemblies in preparation for a gear upshift. Torque may be reduced in the axle assembly that is to be upshifted first. Torque may be increased in at least one other axle assembly to continue to provide or attempt to provide the requested propulsion torque. For example, the torque may be decreased in the first axle assembly and the torque may be increased in the second axle assembly. Torque may be decreased in the first axle assembly by reducing the propulsion torque or increasing the regenerative braking torque provided by the first electric motor to the first transmission. Torque may be increased in the second axle assembly by increasing the propulsion torque or reducing the regenerative braking torque that is provided by the second electric motor to the second transmission. Torque may be redistributed in both axle assemblies simultaneously. Thus, the torque that is provided by the first electric motor may be reduced when the torque that is provided by the second electric motor is increased. In addition, torque may be changed proportionally. For instance, the torque provided by the first electric motor may be reduced at the same rate and by the same amount as torque provided by the second electric motor is increased.

The reduction in torque provided by the first electric motor may facilitate a gear shift. First, reducing torque may make it easier to actuate an associated clutch 80. For instance, in the case of a clutch like a shift collar, the reduction in torque may reduce the force that needs to be exerted by the clutch actuator 82 to move a clutch 80 from a position that engages the first gear ratio to a neutral position. In addition, the reduction in torque may be accompanied by a reduction in rotational speed of a gear of the transmission 38, which in turn may help synchronize the rotational speed of a clutch 80 with the rotational speed of another component that is associated with or is engaged by the clutch to provide the second gear ratio. Thus, the controller 92 may reduce the rotational speed of the first electric motor to reduce the rotational speed of a component that provides the second gear ratio so that there is sufficient synchronization of the rotational speeds to permit successful movement of the clutch, such as movement from the neutral position to engage the second gear ratio. The controller 92 may determine whether sufficient synchronization is present based on signals from the first speed sensor 94 and the second speed sensor 96. For example, sufficient synchronization may be present when the speed or velocity indicated by the signal from the first speed sensor 94 is sufficiently close or within a threshold amount or threshold range of the speed or velocity indicated by the signal from the second speed sensor 96.

At block 102, the gear upshift of the first axle assembly may be executed. The gear upshift may be executed by disengaging the first gear ratio of the first axle assembly and engaging the second gear ratio of the first axle assembly. For instance, a clutch actuator 82 of the first axle assembly may be operated to move a clutch 80 of the first axle assembly. The gear upshift may be executed when there is sufficient rotational speed synchronization as previously discussed.

At block 104, propulsion torque may be redistributed between the axle assemblies in preparation for a second gear upshift. Torque may be reduced in the axle assembly that is to be shifted next. Torque may be increased in the axle assembly that was previously upshifted to continue to provide or attempt to provide the requested propulsion torque. For example, the propulsion torque may be decreased in the second axle assembly and the propulsion torque may be increased in the first axle assembly. Torque may be decreased in the second axle assembly by reducing the torque provided by the second electric motor to the second transmission. Torque may be increased in the first axle assembly by increasing the torque that is provided by the first electric motor to the first transmission. Torque may be redistributed in both axle assemblies simultaneously. Thus, the torque that is provided by the second electric motor may be reduced (or regenerative braking torque may be increased) when the torque that is provided by the first electric motor is increased (or regenerative braking torque may be decreased). In addition, torque may be redistributed proportionally. For instance, the torque provided by the second electric motor may be reduced at the same rate and by the same amount as torque provided by the first electric motor is increased.

At block 106, the gear upshift of the second axle assembly may be executed. The gear upshift may be executed by disengaging the first gear ratio of the second axle assembly and engaging the second gear ratio of the second axle assembly. For instance, a clutch actuator 82 of the second axle assembly may be operated to move a clutch 80 of the second axle assembly. The reduction in torque provided by the second electric motor may facilitate a gear shift in the second axle assembly in the same manner the reduction in torque provided by the first electric motor facilitated the gear shift in the first axle assembly. The gear upshift may be executed when there is sufficient rotational speed synchronization as previously discussed.

At block 108, torque may be redistributed or rebalanced between the first axle assembly and the second axle assembly. For instance, torque provided by the first axle assembly may be reduced and torque provided by the second axle assembly may be increased and both axle assemblies may cooperate to provide the requested propulsion torque. Torque may be reduced in the first axle assembly by reducing the torque provided by the first electric motor to the first transmission. Torque may be increased in the second axle assembly by increasing the torque that is provided by the second electric motor to the second transmission. Torque may be redistributed in both axle assemblies simultaneously. Thus, the torque that is provided by the first electric motor may be reduced when the torque that is provided by the second electric motor is increased. Torque may be rebalanced such that the torque that is provided by the first electric motor to the first transmission and the torque that is provided by the second electric motor to the second transmission are substantially equal. In addition, torque may be redistributed proportionally. For example, the torque provided by the first electric motor may be reduced at the same rate and by the same amount as torque provided by the second electric motor is increased.

Referring to FIG. 3, a flowchart is shown that is associated with executing a gear downshift. The method steps shown in FIG. 3 are used to coordinate and execute a gear downshift for both axle assemblies and are configured to be implemented when both axle assemblies are sufficiently close to operating conditions in which a downshift from the second gear ratio (e.g., high speed gear ratio) to a first gear ratio (e.g., a low speed gear ratio) is desired. For illustration purposes, the method is described under the following initial operational conditions. First, torque is being provided by both the first axle assembly and the second axle assembly. Second, the first axle assembly and the second axle assembly are providing torque via their respective second gear ratios. In addition, the total torque may initially be split substantially equally between the first axle assembly and the second axle assembly.

At block 200, the propulsion torque is redistributed between the axle assemblies in preparation for a gear downshift. Torque may be reduced in the axle assembly that is to be downshifted first. Torque may be increased in the other axle assembly to continue to provide or attempt to provide the requested propulsion torque. For example, the torque may be decreased in the second axle assembly and the torque may be increased in the first axle assembly; however, these designations may be reversed. Torque may be decreased in the second axle assembly by reducing the propulsion torque or increasing the regenerative braking torque provided by the second electric motor to the second transmission. Torque may be increased in the first axle assembly by increasing the propulsion torque or reducing the regenerative braking torque that is provided by the first electric motor to the first transmission. Torque may be redistributed in both axle assemblies simultaneously. Thus, the torque that is provided by the second electric motor may be reduced when the torque that is provided by the first electric motor is increased. For instance, the torque provided by the first electric motor may be reduced at the same rate and by the same amount as torque provided by the second electric motor is increased. In addition, torque may be redistributed proportionally. For example, the torque provided by the second electric motor may be reduced at the same rate and by the same amount as torque provided by the first electric motor is increased.

At block 202, the gear downshift of the second axle assembly may be executed. The gear downshift may be executed by disengaging the second gear ratio of the second axle assembly and engaging the first gear ratio of the second axle assembly. For instance, a clutch actuator 82 of the second axle assembly may be operated to move a clutch 80 of the second axle assembly. The gear downshift may be executed when there is sufficient rotational speed synchronization as previously discussed.

At block 204, propulsion torque may be redistributed between the axle assemblies in preparation for a second gear downshift. Torque may be reduced in the axle assembly that is to be shifted next. Torque may be increased in the axle assembly that was previously downshifted to continue to provide or attempt to provide the requested propulsion torque. For example, the propulsion torque may be decreased or regenerative braking torque may be increased in the first axle assembly and the propulsion torque may be increased or regenerative braking torque may be increased in the second axle assembly. Torque may be redistributed in both axle assemblies simultaneously. Thus, the propulsion torque that is provided by the first electric motor may be reduced (or regenerative braking torque may be increased) when the propulsion torque that is provided by the second electric motor is increased (or regenerative braking torque may be decreased). In addition, torque may be redistributed proportionally. For instance, the torque provided by the first electric motor may be reduced at the same rate and by the same amount as torque provided by the second electric motor is increased.

At block 206, the gear downshift of the first axle assembly may be executed. The gear downshift may be executed by disengaging the second gear ratio of the first axle assembly and engaging the first gear ratio of the first axle assembly. For instance, a clutch actuator 82 of the first axle assembly may be operated to move a clutch 80 of the first axle assembly. The reduction in torque provided by the first electric motor may facilitate a gear shift in the first axle assembly in the same manner the reduction in torque provided by the second electric motor facilitated the gear shift in the second axle assembly. The gear downshift may be executed when there is sufficient rotational speed synchronization as previously discussed.

At block 208, torque may be redistributed or rebalanced between the first axle assembly and the second axle assembly. For instance, torque provided by the second axle assembly may be reduced and torque provided by the first axle assembly may be increased and both axle assemblies may cooperate to provide the requested propulsion torque. Torque may be reduced in the second axle assembly by reducing the propulsion torque or increasing the regenerative braking torque provided by the second electric motor to the second transmission. Torque may be increased in the first axle assembly by increasing the propulsion torque or decreasing the regenerative braking torque that is provided by the first electric motor to the first transmission. Torque may be redistributed in both axle assemblies simultaneously. Torque may be rebalanced such that the torque that is provided by the first electric motor to the first transmission and the torque that is provided by the second electric motor to the second transmission are substantially equal. In addition, torque may be redistributed proportionally. For example, the torque provided by the second electric motor may be reduced at the same rate and by the same amount as torque provided by the first electric motor is increased.

A drive axle system and method as described above may eliminate the temporary loss of torque that may occur when gear shifts of first and second axle assemblies are conducted at the same time, thereby helping avoid a lack of responsiveness perceived by the vehicle driver. Thus, gear shifts may be less perceptible to the driver or a vehicle occupant, thereby improving vehicle drivability and better matching the output of the drive axle system to the driver input.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a drive axle system, the method comprising:
providing torque with a first axle assembly and a second axle assembly, the first axle assembly having a first transmission and a first electric motor that provides torque to the first transmission, the first transmission having a first gear ratio and a second gear ratio that differs from the first gear ratio, and the second axle assembly having a second transmission and a second electric motor that provides torque to the second transmission, the second transmission having a first gear ratio and a second gear ratio that differs from the first gear ratio, wherein torque is provided via the first gear ratio of the first axle assembly and the first gear ratio of the second axle assembly;
decreasing the torque that is provided by the first electric motor to the first transmission;
increasing the torque that is provided by the second electric motor to the second transmission; and
executing a gear upshift of the first axle assembly by disengaging the first gear ratio of the first axle assembly and engaging the second gear ratio of the first axle assembly, wherein executing the gear upshift of the first axle assembly includes disengaging the first gear ratio of the first axle assembly after decreasing the torque provided to the first axle assembly and after increasing the torque provided to the second axle assembly and before executing a gear upshift of the second axle assembly.

2. The method of claim 1 wherein the first gear ratio of the first transmission is greater than the second gear ratio of the first transmission and the first gear ratio of the second transmission is greater than the second gear ratio of the second transmission, and wherein the first electric motor does not provide torque to the second axle assembly and the second electric motor does not provide torque to the first axle assembly.

3. The method of claim 1 wherein decreasing the torque that is provided by the first electric motor to the first transmission and increasing the torque that is provided by the second electric motor to the second transmission occurs simultaneously.

4. The method of claim 1 wherein torque that is provided by the first electric motor to the first transmission and torque that is provided by the second electric motor to the second transmission is substantially equal before decreasing the torque that is provided by the first electric motor to the first transmission.

5. The method of claim 1 further comprising increasing the torque that is provided by the first electric motor to the first transmission and decreasing the torque that is provided by the second electric motor to the second transmission after executing the gear upshift of the first axle assembly.

6. The method of claim 5 wherein increasing the torque that is provided by the first electric motor to the first transmission and decreasing the torque that is provided by the second electric motor to the second transmission occurs simultaneously.

7. The method of claim 5 further comprising executing the gear upshift of the second axle assembly by disengaging the first gear ratio of the second axle assembly and engaging the second gear ratio of the second axle assembly after increasing the torque that is provided by the first electric motor to the first transmission and decreasing the torque that is provided by the second electric motor to the second transmission.

8. The method of claim 7 further comprising decreasing the torque that is provided by the first electric motor to the first transmission and increasing the torque that is provided by the second electric motor to the second transmission after executing the gear upshift of the second axle assembly.

9. The method of claim 8 wherein decreasing the torque that is provided by the first electric motor to the first transmission and increasing the torque that is provided by the second electric motor to the second transmission occurs simultaneously.

10. The method of claim 8 wherein torque that is provided by the first electric motor to the first transmission and torque that is provided by the second electric motor to the second transmission is substantially equal after decreasing the torque that is provided by the first electric motor to the first transmission and increasing the torque that is provided by the second electric motor to the second transmission.

11. The method of claim 7 further comprising:
providing torque with the second gear ratio of the first axle assembly and the second gear ratio of the second axle assembly;
decreasing the torque that is provided by the second electric motor to the second transmission;
increasing the torque that is provided by the first electric motor to the first transmission; and
executing a gear downshift of the second axle assembly by disengaging the second gear ratio of the second axle assembly and engaging the first gear ratio of the second axle assembly.

12. The method of claim 11 wherein the first gear ratio of the first transmission is greater than the second gear ratio of the first transmission and the first gear ratio of the second transmission is greater than the second gear ratio of the second transmission, and wherein the first electric motor does not provide torque to the second axle assembly and the second electric motor does not provide torque to the first axle assembly.

13. The method of claim 11 wherein decreasing the torque that is provided by the second electric motor to the second transmission and increasing the torque that is provided by the first electric motor to the first transmission occurs simultaneously.

14. The method of claim 11 wherein torque that is provided by the first electric motor to the first transmission and torque that is provided by the second electric motor to the second transmission is substantially equal before decreasing the torque that is provided by the second electric motor to the second transmission.

15. The method of claim 11 further comprising increasing the torque that is provided by the second electric motor to the second transmission and decreasing the torque that is provided by the first electric motor to the first transmission after executing the gear downshift of the second axle assembly.

16. The method of claim 15 wherein increasing the torque that is provided by the second electric motor to the second transmission and decreasing the torque that is provided by the first electric motor to the first transmission occurs simultaneously.

17. The method of claim 15 further comprising executing a gear downshift of the first axle assembly by disengaging the second gear ratio of the first axle assembly and engaging the first gear ratio of the first axle assembly after increasing the torque that is provided by the second electric motor to the second transmission and decreasing the torque that is provided by the first electric motor to the first transmission.

18. The method of claim 17 further comprising decreasing the torque that is provided by the second electric motor to the second transmission and increasing the torque that is provided by the first electric motor to the first transmission after executing the gear downshift of the first axle assembly.

19. The method of claim 18 wherein decreasing the torque that is provided by the second electric motor to the second transmission and increasing the torque that is provided by the first electric motor to the first transmission occurs simultaneously.

20. The method of claim 18 wherein torque that is provided by the first electric motor to the first transmission and torque that is provided by the second electric motor to the second transmission is substantially equal after decreasing the torque that is provided by the second electric motor to the second transmission and increasing the torque that is provided by the first electric motor to the first transmission.

* * * * *